Patented Nov. 14, 1950

2,530,212

UNITED STATES PATENT OFFICE 2,530,212

FOODS

Le Roy Victor Strasburger, Baltimore, Md.

No Drawing. Application March 4, 1949,
Serial No. 79,718

6 Claims. (Cl. 99—204)

In the preparation of many varieties of dried beans and peas for human consumption, it has been common to effect their hydration prior to or during the application of heat.

One of the accepted methods has comprised soaking the legumes for from ten to twelve hours in cold water, or a shorter time in hot water; blanching; washing, filling into cans with a vehicle; sealing; processing at 240° to 250° F. to produce sterilization; and cooling. An alternate method in common use comprises washing; filling into cans with a vehicle; sealing; processing at 212° to 218° F. for a time required to produce the desired swelling; elevating the temperature to 240° to 250° F. to produce sterilization; and cooling.

It has now been found that the color characteristics of the products resulting from these methods and others, can be greatly enhanced by submitting the dried legumes to a preliminary dry heating step. Such a treatment not only improves the appearance of the products which have been acceptable heretofore, but renders acceptable to the trade many of the products which have been unpopular solely because of their appearance.

Accordingly, it is an object of this invention to provide a method of improving the color characteristics of foods prepared from dehydrated edible legumes selected from the group consisting of peas and beans, comprising dry heating said legumes sufficiently to darken them upon subsequent hydration. Then upon such subsequent hydration, the treated legumes display an unexpected color difference which is far more evident than it was prior to their hydration. Excellent results have been realized by subjecting the legumes to dry steam at 240° to 250° F. for a time ranging from ten to thirty minutes, the nature, degree and length of such heating varying with the products and the desired end results. Temperatures up to 280° F. may be employed.

After the dry heat treatment, the usual canning operations may be employed, resulting in products of improved appearance, which have not been adversely affected in any way, as to either their flavor or their food value.

Among the various legumes contemplated for treatment according to this invention, are: red beans, light and dark red kidney beans, pinto beans, pea beans, lima beans, baby lima beans, Cecci peas, chick peas, and soya beans. The moisture content of such legumes in their dehydrated or dried form rarely exceeds 22%, and it is probable that variations in this value will to some extent determine the time and temperature of the dry heat employed to treat them. Infra red radiations productive of satisfactory results are contemplated, as are other forms of dry heat which are found to be suitable for the purpose.

Among the various vehicles which have been employed in canning products of the types here under consideration, are water, salt brine with or without such additions as sweetening agents and condiments, tomato sauce, and other sauces.

The simplicity of the method renders it readily applicable in existing canneries without supplementing their present equipment. A few examples of the results obtained will illustrate how the time of treatment affects the color of the product both before and after it has been subjected to subsequent hydration. The following examples are based upon the use of dry steam at 250° F. to afford a basis for comparison. The color plates employed as standards are those appearing in a publication entitled "Dictionary of Color," by Maerz and Paul, 1930 edition, published by McGraw-Hill Book Company, New York.

*Light red kidney beans*

| Minutes Treated | Color Dry | Color Hydrated |
|---|---|---|
| 0 | Plate 5 11–J | Plate 6 10–K |
| 5 | Plate 6 10–L | Plate 7 7–L |
| 10 | Plate 6 10–L | Plate 7 6–L |
| 20 | Plate 6 10–L | Plate 7 4–L |

*Cecci peas*

| Minutes Treated | Color Dry | Color Hydrated |
|---|---|---|
| 0 | Plate 9 6–F | Plate 9 6–I |
| 5 | Plate 9 6–F | Plate 9 6–J |
| 10 | Plate 11 6–G | Plate 11 7–J |
| 20 | Plate 12 6–F | Plate 12 8–J |

In the case of the light red kidney beans, very little color change was detectable as long as they were dry. Subsequent hydration however produced appreciable color changes. The Cecci peas showed a greater variation in color in their dry form than did the kidney beans, which might be expected because of the original yellow color characteristic of the peas.

These examples should not impose limitations upon the products, times, temperatures, media, or other aspects of the invention, beyond the scope of the appended claims.

I claim:

1. A method of improving the color characteristics of foods prepared from dehydrated edible legumes selected from the group consisting of peas and beans, comprising dry heating said legumes sufficiently to darken them upon subsequent hydration, and subsequently hydrating said legumes.

2. A method of treating dehydrated edible beans comprising subjecting said dehydrated beans to a dry heat sufficient to darken them upon subsequent hydration, and subsequently hydrating said beans.

3. A method of treating dehydrated edible beans containing up to 22% moisture, comprising subjecting said dehydrated beans to dry steam for a time sufficient to darken them upon subsequent hydration, and subsequently hydrating said beans.

4. A method of treating dehydrated edible beans comprising subjecting said dehydrated beans to a dry heat sufficient to darken them upon subsequent hydration, and subsequently hydrating and cooking said beans.

5. A method of treating dehydrated edible beans comprising subjecting said dehydrated beans to a dry heat sufficient to darken them upon subsequent hydration, and subsequently hydrating, canning and sterilizing said beans.

6. A method of treating dehydrated edible beans comprising subjecting said dehydrated beans to dry steam at 240° to 250° F. for 10 to 30 minutes to darken them upon subsequent hydration, and subsequently hydrating said beans.

LE ROY VICTOR STRASBURGER.

REFERENCES CITED

The following references are of record in the file of this patent:

UNITED STATES PATENTS

| Number | Name | Date |
|---|---|---|
| 1,803,605 | Fitzgerald | May 5, 1931 |
| 2,060,736 | Loetscher | Nov. 10, 1936 |
| 2,184,246 | Wiltse | Dec. 19, 1939 |